United States Patent
Gunduz et al.

(10) Patent No.: US 9,845,984 B2
(45) Date of Patent: Dec. 19, 2017

(54) REFRIGERATOR COMPRISING A CRISPER

(71) Applicant: ARCELIK ANONIM SIRKETI, Istanbul (TR)

(72) Inventors: Nihat Gunduz, Istanbul (TR); Serdar Kocaturk, Istanbul (TR); Samet Akan, Istanbul (TR); Dilek Sur, Istanbul (TR)

(73) Assignee: ARCELIK ANONIM SIRKETI, Istanbul (TR)

( * ) Notice: Subject to any disclaimer, the term of this patent is extended or adjusted under 35 U.S.C. 154(b) by 0 days.

(21) Appl. No.: 15/027,242

(22) PCT Filed: Oct. 1, 2014

(86) PCT No.: PCT/TR2014/000350
§ 371 (c)(1),
(2) Date: Apr. 4, 2016

(87) PCT Pub. No.: WO2015/050512
PCT Pub. Date: Apr. 9, 2015

(65) Prior Publication Data
US 2016/0238304 A1    Aug. 18, 2016

(30) Foreign Application Priority Data

Oct. 3, 2013 (TR) .............................. a 2013 11633

(51) Int. Cl.
*A47B 96/04* (2006.01)
*F25D 23/08* (2006.01)
(Continued)

(52) U.S. Cl.
CPC .......... *F25D 23/087* (2013.01); *F16B 47/003* (2013.01); *F25D 25/021* (2013.01); *F25D 25/025* (2013.01)

(58) Field of Classification Search
CPC ..... F25D 25/021; F25D 25/025; F16B 47/003
(Continued)

(56) References Cited

U.S. PATENT DOCUMENTS 2,899,256 A * 8/1959 Kelley .................. F25D 23/082
312/296
3,126,589 A * 3/1964 Monti .................. F25D 23/087
49/482.1

(Continued)

FOREIGN PATENT DOCUMENTS

| CA | 2453683 A1 | 6/2005 |
| CN | 102901317 A | 1/2013 |
| KR | 20060119172 A | 11/2006 |

OTHER PUBLICATIONS

International search report for PCT application No. PCT/TR2014/000350.
(Continued)

*Primary Examiner* — Daniel J Troy
*Assistant Examiner* — Timothy M Ayres
(74) *Attorney, Agent, or Firm* — Kilpatrick Townsend & Stockton LLP

(57) ABSTRACT

The present invention relates to a refrigerator (1) comprising a body (2) wherein foods and beverages are placed, at least one drawer (3) that is disposed into the body (2) wherein fruits and vegetables are placed, a crisper (5) that is disposed inside the body (2) so as to be almost parallel to the base and that has a cover plate (4) remaining above the drawer (3) when the drawer (3) is placed into the body (2), and a flexible element (6) that is disposed on the crisper (5) and that provides airproofing between the interior of the crisper (5) and the exterior of the crisper (5).

13 Claims, 4 Drawing Sheets

Figure 1:
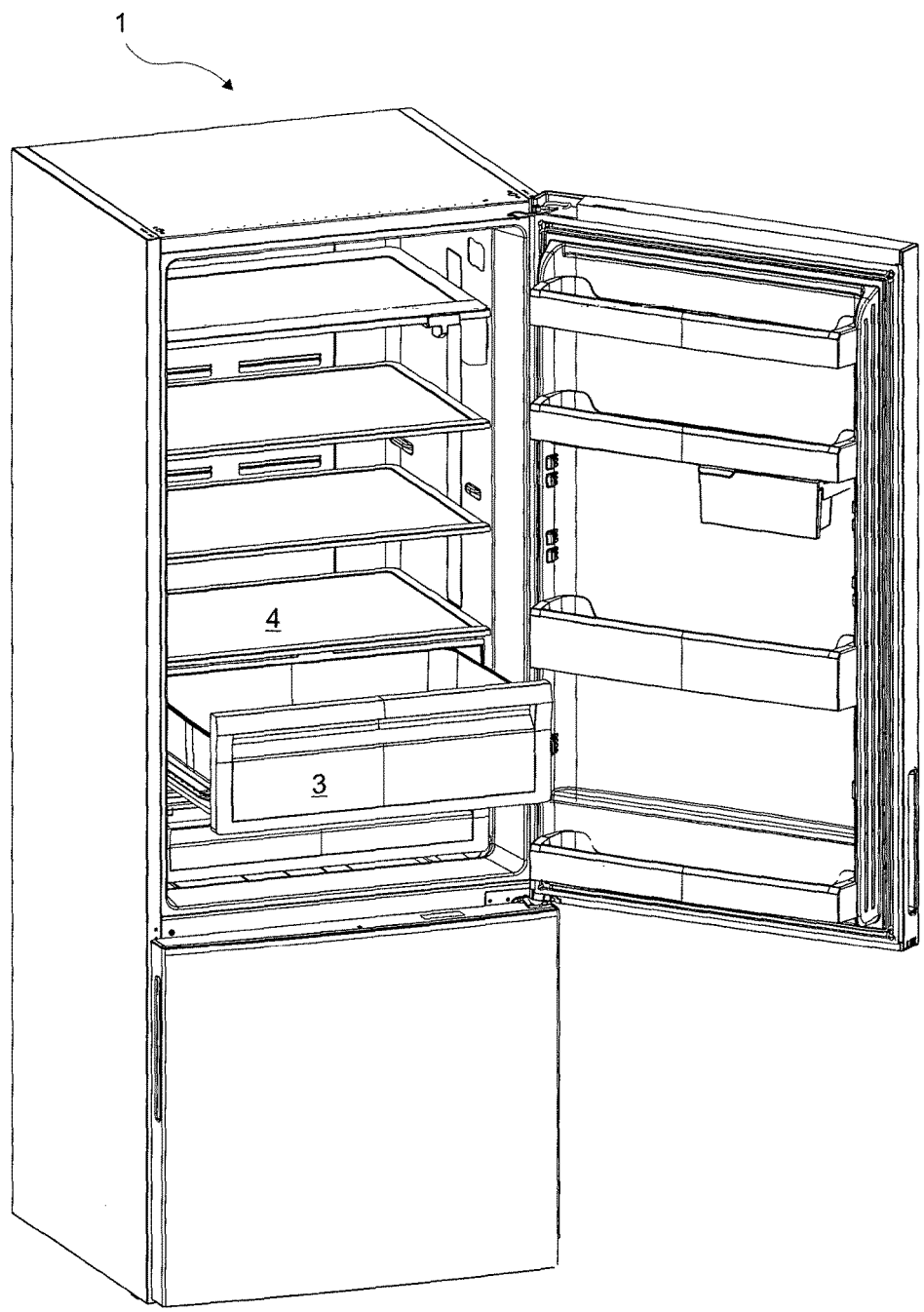

(51) Int. Cl.
*F25D 25/02* (2006.01)
*F16B 47/00* (2006.01)

(58) Field of Classification Search
USPC .......................................................... 312/404
See application file for complete search history.

(56) References Cited

U.S. PATENT DOCUMENTS

| | | | | |
|---|---|---|---|---|
| 4,001,974 | A * | 1/1977 | Wright | E06B 7/2312 428/122 |
| 4,173,378 | A * | 11/1979 | Hanson | F25D 23/069 312/270.3 |
| 4,751,826 | A * | 6/1988 | Kawahara | F25D 11/02 62/382 |
| 4,850,206 | A * | 7/1989 | Larsen | F25D 17/04 62/382 |
| 5,641,217 | A * | 6/1997 | Caruso | A47B 88/0455 312/334.23 |
| 9,140,483 | B2 * | 9/2015 | Park | F25D 25/025 |
| 2012/0262046 | A1 * | 10/2012 | Park | F25D 25/025 312/404 |

OTHER PUBLICATIONS

Written opinion of the international searching authority for PCT application No. PCT/TR2014/000350.
International search report for PCT application No. PCT/TR2014/000353.
Written opinion of the international searching authority for PCT application No. PCT/TR2014/000353.
International search report and written opinion, dated Mar. 24, 2015, of corresponding International Application No. PCT/TR2014/000350; 7 pgs.

* cited by examiner

REFRIGERATOR COMPRISING A CRISPER

The present invention relates to a refrigerator that comprises a crisper, leakproofing of which is realized.

Refrigerators comprise a fresh food compartment wherein foods and beverages are stored, a freezer compartment that enables foods to be stored by being frozen, and a crisper that is disposed in the fresh food compartment wherein foods such as vegetables and fruits are stored. In order to prevent the foods placed in the crisper from dehydrating by sweating, the air flow between the crisper and the fresh food compartment is enabled to remain at a limited level. Accordingly, a temperature difference, although small, occurs between the crisper and the fresh food compartment interior volume. Depending on the temperature difference, sweating occurs on the surfaces that separate the fresh food compartment interior volume and the crisper. The sweating occurring on the surfaces of the crisper results in dripping of water on the foods stored in the crisper and this causes the foods to spoil by adversely affecting storage lives of the foods. Therefore, it is required to give air into the crisper controllably and to provide airproofing especially in some areas of the crisper. However, there may be some irregular curved surfaces on the surfaces of the crisper that can or cannot be noticed when viewed due to production tolerances. These surfaces are required to be almost entirely covered. Moreover, that the drawer placed by the user does not remain precisely at the same point every time makes it difficult to provide a complete leak-proofing especially at the rear of the crisper and to provide leak-proofing between the base and the drawer.

In the Korean Patent Application No. KR20060119172, an elastic gasket application is disclosed, that is disposed between the ceiling and the drawer and that provides leak-proofing.

The aim of the present invention is the realization of a refrigerator wherein airproofing is provided at the rear of the crisper, between the interior and exterior of the crisper.

The refrigerator realized in order to attain the aim of the present invention, explicated in the first claim and the respective claims thereof, comprises a crisper having a cover plate that almost divides the body into two separate volumes, and a flexible element that is disposed on the cover plate, that is positioned at the portion of the cover plate close to the rear wall of the body, that extends from the cover plate towards the base, that prevents air from leaking into the interior of the crisper and the exterior of the crisper from between the rear side of the drawer and the rear side of the cover plate and that almost entirely covers the drawer along the rear wall of the drawer when the drawer is placed into the body.

In an embodiment of the present invention, the two ends of the flexible element are not aligned. Each end faces a different direction.

In an embodiment of the present invention, the flexible element remains between the rear wall of the drawer and the body. When the drawer is placed into the body, a distance remains between at least some portion of the rear end of the cover plate and the drawer. A distance remains between the drawer and the body, and the cover plate at least partially covers the said area.

In an embodiment of the present invention, the flexible element has a partial radius configuration.

In an embodiment of the present invention, the refrigerator comprises more than one strength-increasing rib that extends between the two ends of the flexible element.

In an embodiment of the present invention, the flexible element is detachably attached to the cover plate.

In an embodiment of the present invention, the refrigerator comprises more than one hole arranged on the cover plate and more than one protrusion that is disposed on the flexible element, each one being inserted into the said holes and enabling the flexible element to be attached to the cover plate.

In another embodiment of the present invention, the flexible element is produced integrated with the cover plate.

In another embodiment of the present invention, the flexible element is produced integrated with the cover plate by plastic injection method.

In another embodiment of the present invention, the flexible element is adhered to the cover plate by means of an adhesive.

In another embodiment of the present invention, the refrigerator comprises a profile that extends from over the flexible element towards the rear wall of the body and that contacts the rear wall of the body when the drawer is placed into the body.

In a derivative of this embodiment, the profile extends from one end of the flexible element up to the other farther end.

In an embodiment of the present invention, the flexible element comprises two side walls that are disposed at two sides of the flexible element, preventing air from leaking from the sides of the flexible element.

By means of the present invention, sweating is prevented from occurring on the surfaces of the crisper and the drawer, and foods stored in the crisper are prevented from being spoiled due to water dripping thereon, hence the storage lives of foods in the crisper are enabled to be increased.

A refrigerator realized in order to attain the aim of the present invention is illustrated in the attached figures, where:

FIG. 1—is the perspective view of a refrigerator.

Figure 2:
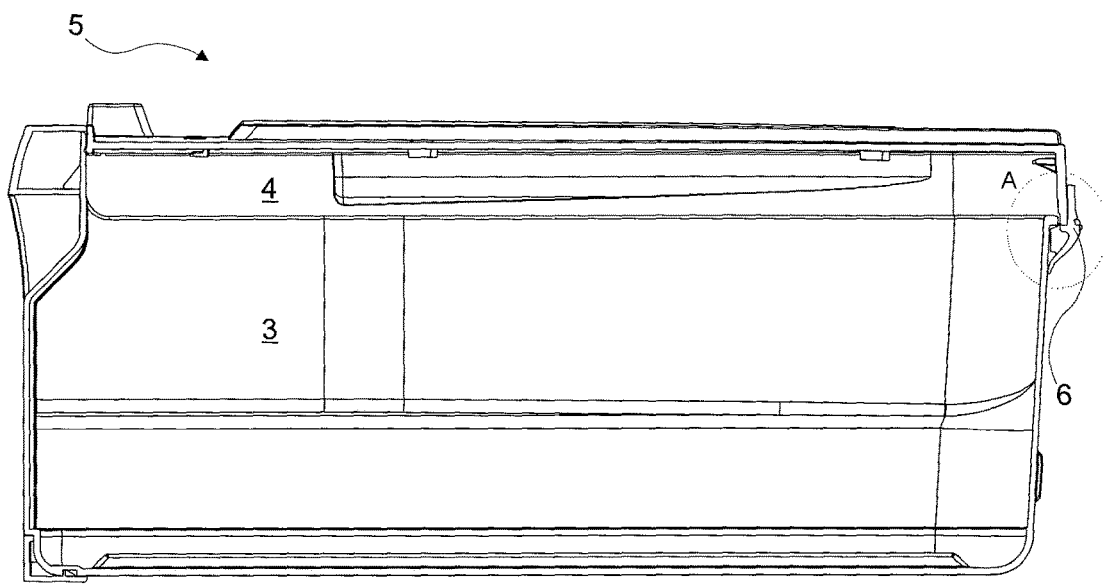

FIG. 2—is the sideways view of the crisper in an embodiment of the present invention.

Figure 3:
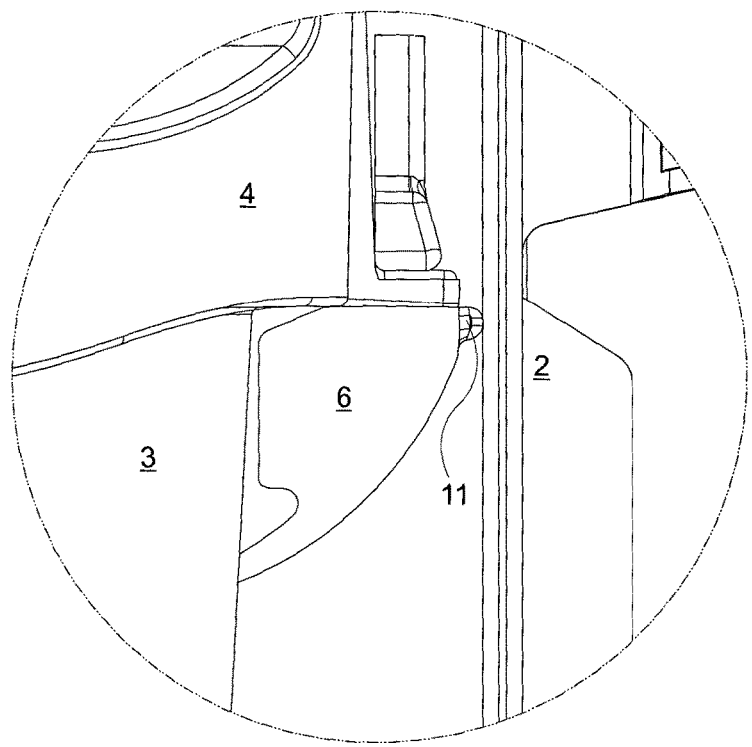

FIG. 3—is the view of detail A.

Figure 4:
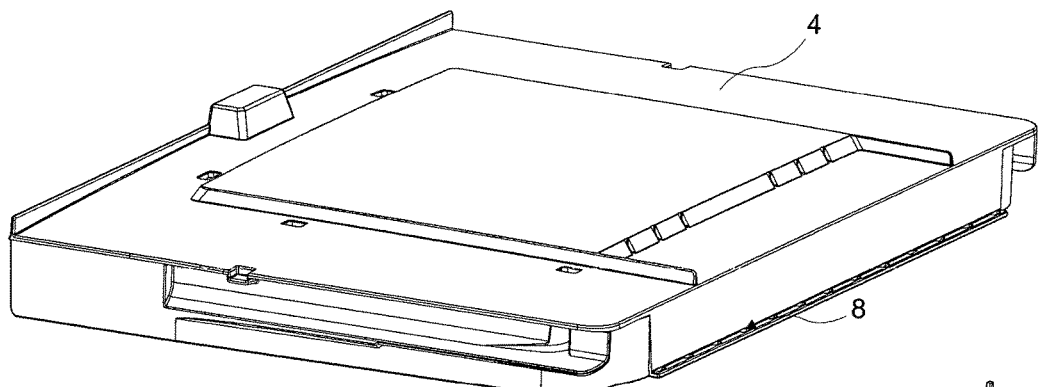
Figure 4:
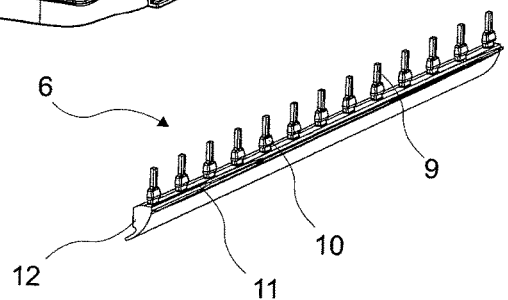

FIG. 4—is the perspective view of the cover plate and the flexible element in an embodiment of the present invention.

Figure 5:
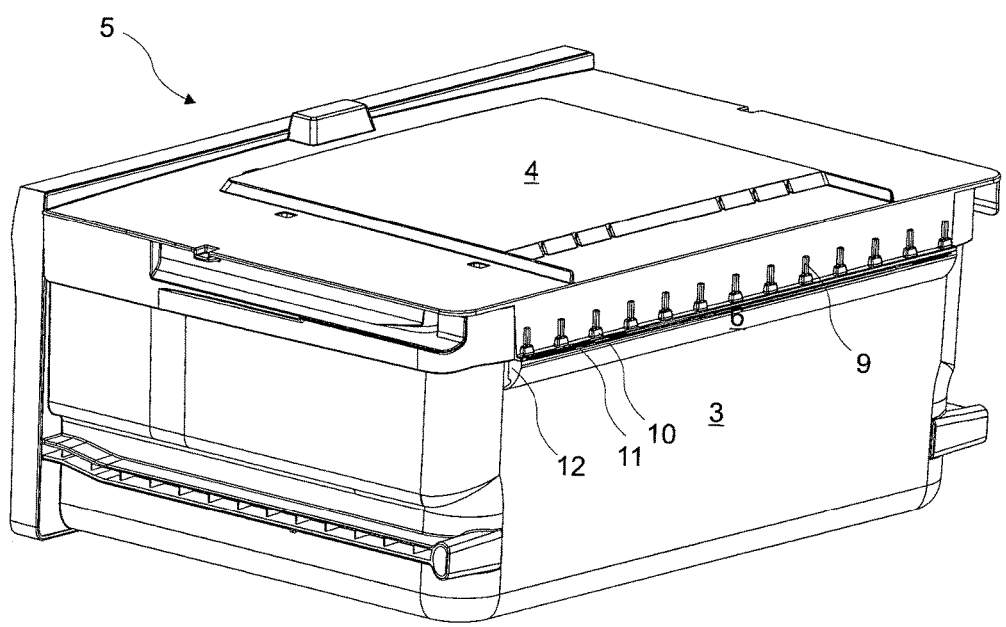

FIG. 5—is the rear perspective view of the crisper in an embodiment of the present invention.

Figure 6:
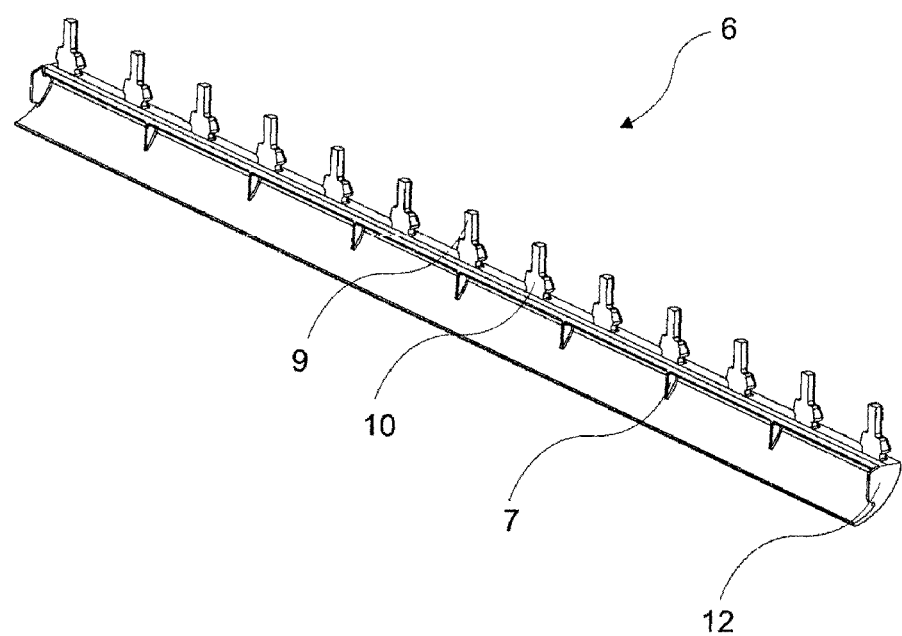

FIG. 6—is the perspective view of the flexible element in an embodiment of the present invention.

The elements illustrated in the figures are numbered as follows:
1. Refrigerator
2. Body
3. Drawer
4. Cover plate
5. Crisper
6. Flexible element
7. Rib
8. Hole
9. Protrusion
10. Connector
11. Profile
12. Side wall The refrigerator (1) comprises a body (2) wherein foods and beverages are placed, at least one drawer (3) that is disposed into the body (2) and wherein fruits and vegetables are placed, a crisper (5) that is disposed inside the body (2) so as to be almost parallel to the base and that has a cover plate (4) remaining above the drawer (3), and a flexible element (6) that is disposed on the crisper (5) and that provides airproofing between the interior of the crisper (5) and the exterior of the crisper (5).

The refrigerator (1) of the present invention comprises the flexible element (6) that is situated at the rear side of the cover plate (4), that extends downwards from the cover plate (4), that extends almost all along the rear side of the cover plate (4) and that provides airproofing at the rear side of the crisper (5), between the interior of the crisper (5) and the exterior of the crisper (5) by contacting the rear wall of the drawer (3) when the drawer (3) is placed into the body (2).

When the user places the drawer (3) into the body (2), the rear wall of the drawer (3) at least partially bears against the flexible element (6). By means of the flexible element (6) extending downwards from the cover plate (4), air is prevented from entering the crisper (5) from between the drawer (3) and the cover plate (4) at the rear side of the crisper (5) or from leaving the crisper (5) to the outside of the crisper (5). The air delivered from the air blowing opening (A) arranged on the body (2) to the cover plate (4) is partially delivered into the crisper (5) through the air inlets arranged on the cover plate (4). The cover plate (4) is placed into the refrigerator (1) so that air does not leak from between the right and left sides of the cover plate (4) and the side walls of the body (2).

In an embodiment of the present invention, the flexible element (6) has a curved configuration, extending towards the drawer (3). While one end of the flexible element (6) remains on the cover plate (4), the other end faces the rear wall of the drawer (3). The end facing the rear wall of the drawer (3) bears against the rear wall of the drawer (3) when the drawer (3) is placed into the body (2). The said inclination increases the pressure the flexible element (6) exerts on the rear wall. Thus, the flexible element (6) bears against the drawer (3) firmly along the rear wall of the drawer (3).

In an embodiment of the present invention, the drawer (3) is placed into the body (2) so that a distance remains between at least some portion of the rear side of the cover plate (4) and the drawer (3). The flexible element (6) extends from the portion of the cover plate (4) that remains between the drawer (3) and the body (2).

In an embodiment of the present invention, the flexible element (6) is almost "J"-shaped. Thanks to this shape, while one end of the flexible element (6) is on the cover plate (4), the other end remaining free bears against the rear wall of the drawer (3) when the drawer (3) is placed into the body (2).

In an embodiment of the present invention, the refrigerator (1) comprises more than one strength-increasing rib (7) disposed on the flexible element (6). The flexible element (6) bears against the surface of the drawer (3) more firmly by means of the ribs (7) extending between the two ends of the flexible element (6) and along the surface of the flexible element (6) shaped as a hollow quarter cylinder.

In an embodiment of the present invention, the flexible element (6) is detachably attached to the cover plate (4). The flexible element (6) can be detached and cleaned by the user when desired.

In an embodiment of the present invention, the refrigerator (1) comprises more than one hole (8) arranged on the cover plate (4) and more than one protrusion (9) that is disposed on the flexible element (6), each one being inserted into the said holes (8) and enabling the flexible element (6) to be connected to the cover plate (4). The protrusions (9) inserted through the holes (8) by the operator enable the surfaces of the flexible element (6) and the cover plate (4) to contact each other so that air almost does not leak therebetween and also enable the flexible element (6) to be connected to the cover plate (4).

In an embodiment of the present invention, the refrigerator (1) comprises a connector (10) that is disposed on the protrusion (9), that has a chamfered configuration and a width at least as much as the cross-section of the hole (8) and that enables the flexible element (6) to be connected to the cover plate (4) leak-proofingly by bearing against the periphery of the hole (8) when the protrusion (9) is inserted through the hole (8).

In another embodiment of the present invention, the flexible element (6) is produced with the cover plate (4) as a single piece.

In another embodiment of the present invention, the flexible element (6) is produced with the cover plate (4) as a single piece by plastic injection method. The flexible element (6) is produced by implementing plastic injection into a mold.

In another embodiment of the present invention, the flexible element (6) is adhered to the cover plate (4) by means of an adhesive. Thus, ease of production is provided.

In an embodiment of the present invention, the flexible element (6) comprises a profile (11) that extends from over the flexible element (6) towards the rear wall of the body (2) and that contacts the rear wall of the body (2) when the drawer (3) is placed into the body (2). Thus, by means of the profile (11) the flexible element (6) is prevented from making an undesired sound by impacting the body (2) while the drawer (3) is being placed into the body (2) In the situation the drawer (3) is placed into the crisper (5) rather quickly, the profile (11) makes point contact with the body (2) and prevents creation of sound due to severe impact.

In a derivative of this embodiment, the profile (11) extends along the flexible element (6). Thus, while contacting the body (2), the profile (11) provides leak-proofing at the rear side of the crisper (5), between the flexible element (6) and the body (2) and helps the leak-proofing at the rear side of the crisper (5) to be more durable.

In an embodiment of the present invention, the flexible element (6) comprises two side walls (12) that are disposed at two sides of the flexible element (6) and that prevent air from leaking from the sides of the flexible element (6). The side walls (12) extend from the flexible element (6) towards the drawer (3).

By means of the present invention, a refrigerator (1) is realized, wherein air is prevented from leaking at the rear side of the crisper (5), between the interior of the crisper (5) and the exterior of the crisper (5) and air flow is controlled inside the crisper (5) and humidity control of the crisper (5) is maintained by means of the flexible element (6) disposed at the rear side of the crisper (5).

The invention claimed is:

1. A refrigerator (1) comprising:
   a body (2) wherein foods and beverages are placed,
   at least one drawer (3) that is disposed into the body (2) wherein fruits and vegetables are placed,
   a crisper (5) that is disposed inside the body (2) so as to be almost parallel to the base and that has a cover plate (4) remaining above the drawer (3), and
   a flexible element (6) that is disposed on the crisper (5) and that provides airproofing between the interior of the crisper (5) and the exterior of the crisper (5),
   wherein the flexible element (6) is situated at a rear side of the cover plate (4) and extends along the rear side of the cover plate (4), the flexible element being adjacent to and extending downwards from the cover plate (4), the flexible element providing airproofing at the rear side of the crisper (5) between the interior of the crisper (5) and the exterior of the crisper (5) by contacting a rear wall of the drawer (3) when the drawer (3) is placed into the body (2), the flexible element (6) comprising a profile (11) that protrudes towards the rear wall of the body (2) such that the profile (11) contacts the rear wall of the body (2) when the drawer (3) is placed into the body (2).

2. A refrigerator (1) as in claim 1, wherein the flexible element (6) has a curved configuration, that extends towards the drawer (3).

3. A refrigerator (1) as in claim 2, wherein the drawer (3) is placed into the body (2) so that a distance remains between at least some portion of the rear side of the cover plate (4) and the drawer (3), and wherein the flexible element (6) extends from the portion of the cover plate (4) that remains between the drawer (3) and the body (2).

4. A refrigerator (1) as in claim 1, wherein the flexible element (6) is substantially "J" shaped.

5. A refrigerator (1) as in claim 1, wherein the flexible element (6) has more than one strength-increasing rib (7) thereon.

6. A refrigerator (1) as in claim 1, wherein the flexible element (6) is detachably attached to the cover plate (4).

7. A refrigerator (1) as in claim 1, wherein more than one hole (8) are arranged on the cover plate (4) and more than one protrusion (9) are disposed on the flexible element (6), each one being inserted into the said holes (8) and enabling the flexible element (6) to be connected to the cover plate (4).

8. A refrigerator (1) as in claim 7, wherein a connector (10) is disposed on the protrusion (9), the connector having a chamfered configuration and a width at least as much as the cross-section of the hole (8) the connector enabling the flexible element (6) to be connected to the cover plate (4) leak-proofingly by bearing against the periphery of the hole (8) when the protrusion (9) is inserted through the hole (8).

9. A refrigerator (1) as in claim 1, wherein the flexible element (6) is produced with the cover plate (4) as a single piece.

10. A refrigerator (1) as in claim 1, wherein the flexible element (6) is adhered to the cover plate (4).

11. A refrigerator (1) as in claim 1, wherein the profile (11) extends along the flexible element (6) such that while contacting the body (2), the profile (11) provides leak-proofing at the rear side of the crisper (5), between the flexible element (6) and the body (2).

12. A refrigerator (1) as in claim 1, wherein two side walls (12) are disposed at two sides of the flexible element (6) and that prevent air from leaking from the sides of the flexible element (6).

13. A refrigerator (1) as in claim 1, wherein the profile (11) contacts the body (2) when the drawer (3) is placed into the body (5) such that the profile (11) absorbs impact and resulting sound.

* * * * *